Jan. 30, 1945.    G. F. JARDINE    2,368,472
GLASS FORMING MACHINE
Filed Oct. 21, 1941
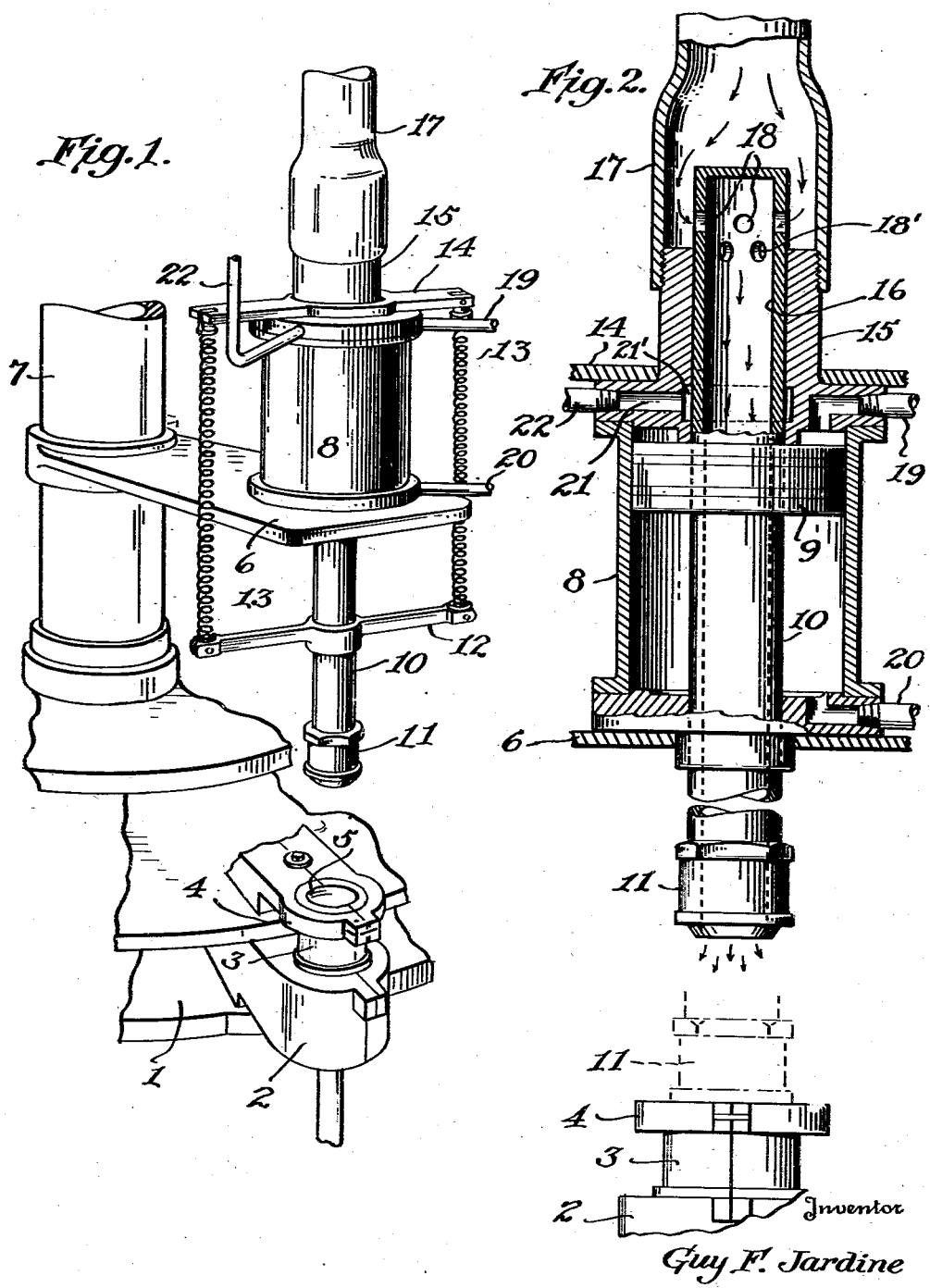
Inventor
Guy F. Jardine
By
Eulister + Eulister
Attorneys Patented Jan. 30, 1945

2,368,472

UNITED STATES PATENT OFFICE 2,368,472

GLASS FORMING MACHINE

Guy F. Jardine, Washington, Pa., assignor to Hazel-Atlas Glass Company, Wheeling, W. Va., a corporation of West Virginia Application October 21, 1941, Serial No. 415,973

6 Claims. (Cl. 49—19)

The invention relates to improvements in glass forming machines, and particularly to improved means for delivering the cooling wind and the compressed air for blowing purposes.

In the operation of forming machines by which glass articles are blown, it is necessary to supply relatively high pressure compressed air for blowing the parison to the form of the article being manufactured, and it is also necessary to supply low pressure cooling wind for cooling the blown articles.

The practice has been to blow the articles at one station, and then apply the cooling wind at the next station. During this interval, without any cooling wind, the blown articles remain hot and sometimes collapse.

One of the objects of the present invention is to provide a very simple construction by which the high pressure blowing air and the low pressure cooling wind will be delivered at the same station. By this arrangement the cooling wind is delivered as soon as the blowhead is lifted. Thus the blown article is at once cooled sufficiently to set it and thereby prevent collapse, and at the same time the cooling operation is so short that there is no resulting shock or tendency for the glass to crystallize.

More specifically, an object of the invention is to provide a construction by which blowing air will be automatically delivered through the blowhead when it is down in its blowing position, and by which low pressure cooling wind will be automatically delivered through the blowhead as soon as it is lifted from its blowing position.

Various other objects and advantages of the invention will be apparent to those skilled in the art, from the following detailed description taken in connection with the accompanying drawing, in which, Figure 1 is a perspective view of the machine; and Figure 2 is a vertical sectional view of the apparatus for delivering the cooling wind and the blowing air; the blowhead being shown in dotted lines in its down position.

Referring to the drawing in more detail, numeral 1 indicates the table of a rotary glass forming machine, carrying any desired number of blow mold holders 2, blow molds 3, neck ring holders 4 and neck rings 5. It will be understood that the invention is adapted to use with any type of glass forming machine in which the articles are formed by a blowing operation, and therefore it is unnecessary to illustrate any particular forming machine in detail.

Numeral 6 indicates a bracket which is supported from the central column 7 of the machine, and upon which is mounted a cylinder 8. The piston 9 of this cylinder has a hollow piston rod 10, and threaded on the lower end of the hollow piston rod is a blowhead 11. A yoke 12 is attached to the lower portion of the piston rod, and this yoke is connected by springs 13 with a similar yoke 14 on top of the cylinder 8. These springs act as a safety device. For example, if the air pressure for operating the cylinder should fail, or be accidentally shut off, the springs would lift the blowhead from the mold, thereby permitting the continued rotation of the machine without breakage of parts. The springs also function to soften the contact of the blowhead with the molds.

An upstanding sleeve 15 is provided on the top of the cylinder 8, and in this sleeve reciprocates an upwardly extending portion 16 of the hollow piston rod 10. Attached to the upper end of the sleeve 15 is a pipe 17 which supplies cooling wind of low pressure, which is usually in the neighborhood of 12 ounces, although this may be varied as desired. The upper end of the upwardly extending hollow piston rod portion 16 is provided with a series of openings or ports 18, through which the cooling wind can, at certain times, enter the piston rod and pass on through the blowhead 11. If desired, a second series of ports 18' may be provided below the first series.

The piston and its piston rod are vertically reciprocated by means of compressed air alternately admitted to opposite ends of the cylinder 8, through lines 19 and 20. The operation of the cylinder is controlled by any desired type of timer (not shown) associated with the forming machine.

The top of the cylinder 8 is also provided with a passage or port 21 which communicates at its inner end with an annular passage 21', and which has its outer end connected to a pipe 22 leading to a source of compressed air. The compressed air delivered through pipe 22, port 21, and passage 21' is for the purpose of blowing the glass articles, and the pressure is usually between 36 and 40 pounds. At certain times this compressed air passes through the ports 18, or ports 18', to the interior of the piston rod, through which it flows to the blowhead for performing the blowing operation.

In operation, when the piston and piston rod are moved downwardly for the blowing operation, the ports 18 and 18' will pass within the sleeve 15, thereby cutting off communication between the cooling wind pipe 17 and the interior of the piston rod. The piston and rod continue their downward movement, and just as the blowhead reaches its operative blowing position the ports 18 will align with the annular passage 21' whereby blowing air, under relatively high pressure, will enter the piston rod and pass through the blowhead to the interior of the glass parison, to blow it to the final form of the particular article being fabricated. If the piston and piston rod do not quite reach the limit of their descent, then the ports 18' will align with the annular passage 21'.

When the piston and its rod are lifted the blowing air will be automatically shut off as the ports 18 or 18' move out of alignment with the passage 21', and when the piston and rod approach the upper limit of their movement the ports 18 will pass the top of the sleeve 15 and thereby automatically open communication between the cooling wind pipe 17 and the blowhead, so that cooling wind will be blown against the glass article.

Thus a single mechanism, of very simple construction, delivers both the low pressure cooling wind and the relatively high pressure blowing air, and both the cooling wind and the blowing air are automatically admitted and shut off by the movement of the piston rod which carries the blowhead.

By this simple construction the cooling wind and the blowing air are delivered at the same station, so that the articles are cooled sufficiently at the blowing station to become set, and thereby avoiding the collapsing of the articles as may occur when the cooling wind is not applied until the articles reach the next station.

I have shown only one blowhead and associated parts on the forming machine, and have described the operation by which blowing air will enter the parison and blow the article when the parison is in lowered position, and by which cooling wind will be blown against the glass article, at the same station, when the blowhead is thereafter elevated. But in some instances a second blowing operation is performed, and of course another blowhead and associated parts are employed in machines where this is desirable. At the second blowing station the operation will be substantially the same. When the blowhead is lowered blowing air will pass therethrough to admit blowing air to the interior of the blown article to give a second blowing operation, and when the blowhead is then lifted cooling wind will be blown against the article. Of course when the cooling wind is not to be employed it may be shut off by a valve (not shown) provided in the pipe 17.

Also, where two or more blow molds are operated as a unit, two or more of the blowheads and associated parts are employed, and in such machines if a second blowing operation is desirable the necessary additional blowheads and associate parts are provided on the machine.

Having fully described the invention, what I claim is:

1. A glass forming machine, including blow molds and a blowhead, a fluid motor for moving the blowhead down to and up from blowing position, said blowhead adapted to communicate, at different periods, with a source of low pressure cooling wind and a source of relatively high pressure blowing air, and means for shutting off communication between the blowhead and the source of low pressure cooling wind and opening communication between the blowhead and the source of relatively high pressure blowing air, as the blowhead moves down to blowing position.

2. A glass forming machine, including blow molds and a blowhead, a fluid motor for moving the blowhead down to and up from blowing position, said blowhead adapted to communicate, at different periods, with a source of low pressure cooling wind and a source of relatively high pressure blowing air, and means for shutting off communication between the blowhead and the source of relatively high pressure blowing air and opening communication between the blowhead and the source of low pressure cooling wind, as the blowhead moves up from blowing position.

3. A glass forming machine, including blow molds, a vertically arranged fluid motor, a hollow piston rod operated by said motor, a blowhead attached to the lower end of said hollow piston rod, said piston rod having a port, a source of low pressure cooling wind and a source of relatively high pressure blowing air, and said port communicating with the source of relatively high pressure blowing air when the blowhead is moved downwardly to blowing position by said motor, and with the source of low pressure cooling wind when the blowhead is moved upwardly from blowing position by said motor.

4. A glass forming machine, including blow molds, a vertically arranged fluid motor, a hollow piston rod operated by said motor, a blowhead attached to the lower end of said hollow piston rod, said piston rod having a port, a sleeve extending upwardly from the top of said motor, a pipe conveying low pressure cooling wind attached to the upper end of said sleeve, the lower portion of said sleeve provided with a passage, a pipe conveying relatively high pressure blowing air leading to said passage, a portion of the hollow piston rod provided with said port reciprocable in said sleeve, said port communicating with the passage conveying relatively high pressure blowing air when the blowhead is moved downwardly to blowing position by said motor, and said port communicating with the pipe conveying low pressure cooling wind when the blowhead is moved upwardly from blowing position by said motor.

5. A glass forming machine, including blow molds and a blowhead, means for moving the blowhead to and from blowing position, said blowhead adapted to communicate, at different periods, with a source of low pressure cooling wind and a source of relatively high pressure blowing air, and means for shutting off communication between the blowhead and the source of low pressure cooling wind and opening communication between the blowhead and the source of relatively high pressure blowing air, as the blow mold moves to blowing position.

6. A glass forming machine, including blow molds and a blowhead, means for moving the blowhead to and from blowing position, said blowhead adapted to communicate, at different periods, with a source of low pressure cooling wind and a source of relatively high pressure blowing air, and means for shutting off communication between the blowhead and the source of relatively high pressure blowing air and opening communication between the blowhead and the source of low pressure cooling wind, as the blowhead moves away from blowing position.

GUY F. JARDINE.